United States Patent
Karale (10) Patent No.: US 9,961,047 B2
(45) Date of Patent: May 1, 2018

(54) NETWORK SECURITY MANAGEMENT (71) Applicant: BRITISH TELECOMMUNICATIONS PUBLIC LIMITED COMPANY, London (GB)

(72) Inventor: Sachin Karale, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days. days.

(21) Appl. No.: 14/654,301

(22) PCT Filed: Dec. 23, 2013

(86) PCT No.: PCT/GB2013/000564
§ 371 (c)(1),
(2) Date: Jun. 19, 2015

(87) PCT Pub. No.: WO2014/096761
PCT Pub. Date: Jun. 26, 2014

(65) Prior Publication Data
US 2015/0358292 A1 Dec. 10, 2015

(30) Foreign Application Priority Data
Dec. 21, 2012 (EP) .................................... 12250186

(51) Int. Cl.
*H04L 29/06* (2006.01)

(52) U.S. Cl.
CPC ...... *H04L 63/0263* (2013.01); *H04L 63/1408* (2013.01); *H04L 63/1441* (2013.01)

(58) Field of Classification Search
CPC ............. H04L 63/0263; H04L 63/1408; H04L 63/1441; H04L 9/00; G06F 11/00
See application file for complete search history.

(56) References Cited

U.S. PATENT DOCUMENTS

| 7,159,237 B2 * | 1/2007 | Schneier ............... G06F 21/552 709/223 |
| 7,506,373 B2 * | 3/2009 | Morin ................ G06Q 20/0855 340/566 |

(Continued)

FOREIGN PATENT DOCUMENTS

| WO | WO 01/71499 | 9/2001 |
| WO | WO 2010/114363 | 10/2010 |

OTHER PUBLICATIONS

Feng Xuewei, "Analyzing and correlating security events using state machine", 2010, p. 2849-2854.*

(Continued)

*Primary Examiner* — Wasika Nipa
(74) *Attorney, Agent, or Firm* — Nixon & Vanderhye P.C.

(57) ABSTRACT

Methods and apparatus are disclosed for processing status messages for use in network security management in respect of a network of computing devices, the status messages comprising data relating to a plurality of attributes; the method comprising: filtering received status messages according to filtering rules in order to identify (i) status messages indicative of potential or actual network security events in respect of which a predetermined response is deemed applicable; (ii) status messages in respect of which a null response is deemed applicable; and (iii) residue messages not identified as (i) or (ii); processing messages identified as (i) such that a predetermined response may be initiated; performing analysis involving clustering in respect of messages identified as residue messages; and updating the filtering rules for use in subsequent filtering of received status messages in dependence on the result of the analysis.

23 Claims, 8 Drawing Sheets

Message Flow in a Network Security Monitoring Process (56) References Cited

U.S. PATENT DOCUMENTS

| 7,895,641 B2 | 2/2011 | Schneier et al. |
| 8,176,527 B1 | 5/2012 | Njemanze et al. |
| 2004/0015719 A1 | 1/2004 | Lee et al. |
| 2005/0060562 A1 | 3/2005 | Bhattacharya et al. |

OTHER PUBLICATIONS

International Search Report for PCT/GB2013/000564, dated Feb. 24, 2014, 4 pages.
Search Report for EP 12 25 0186, dated Jun. 6, 2013, 10 pages.
Written Opinion of the ISA for PCT/GB2013/000564, dated Feb. 24, 2014, 7 pages.
Julisch, "Mining Alarm Clusters to Improve Alarm Handling Efficiency", IBM Research, Zurich Research Laboratory, 2001, 10 pages.
Adelina et al, "An efficient Algorithm for Clustering Intrusion Alert", Journal of Theoretical and Applied Information Technology, vol. 37, No. 2, Mar. 31, 2012, pp. 234-240.
Xuewei et al., "Analyzing and Correlating Security Events Using State Machine", 2010 10$^{th}$ IEEE International Conference on Computer and Information Technology, 2010, 6 pages.
Vaarandi, "A Data Clustering Algorithm for Mining Patterns From Event Logs", Department of Computer Engineering, Tallinn Technical University, IEEE 2003, 9 pages.

\* cited by examiner

Figure 1 - Message Flow in a Network Security Monitoring Process

Figure 2 – Logging of network traffic for analysis

Figure 3 - Message flow in Data Collection and Filtering System

Figure 4 - Manual residue message handling process

Figure 5 - Residue message handling process using clustering

Figure 6 – Concept of clustering for residue messages analysis

Figure 7 - Residue Message Process

Figure 8 - Flowchart for filter engine updating process

| src | src_port | Dst | dst_port | dst_co untry | service | REDefID | date | time | device_id | duration | app | app _cat | user |
|---|---|---|---|---|---|---|---|---|---|---|---|---|---|
| 172.30.12.42 | 3108 | 74.125.230.110 | 80 | US | HTTP | FortiGate | 13/04/2011 | 12:43:17 | FGT3KB3408600 584 | 105 | HTTP.Image | file-transfer | SALAS.A |
| 172.30.12.42 | 3101 | 74.125.230.114 | 80 | US | HTTP | FortiGate | 13/04/2011 | 12:43:17 | FGT3KB3408600 584 | 106 | Google.Maps | web | SALAS.A |
| 172.18.186.143 | 2685 | 172.16.254.20 | 88 | N/A | 88/udp | FortiGate | 13/04/2011 | 12:43:17 | FG300B3908607 012 | 182 | N/A | N/A | N/A |

Figure 9 - Examples of message data

Figure 10 - Subspace clustering for residue message analysis

Figure 11 - Various stages of residue message analysis by clustering

NETWORK SECURITY MANAGEMENT

This application is the U.S. national phase of International Application No. PCT/GB2013/000564 filed 23 Dec. 2013, which designated the U.S. and claims priority to EP Patent Application No. 12250186.9 filed 21 Dec. 2012, the entire contents of each of which are hereby incorporated by reference.

TECHNICAL FIELD

The present invention relates generally to network security management and, more specifically, to methods and systems for processing status messages for use in network security management in respect of a network of computing devices. Aspects of the invention relate also to dynamic network intrusion monitoring, detection and response.

BACKGROUND TO THE INVENTION AND PRIOR ART

In general, computer and network security products focus on the prevention of various possible types of attack on the security of the network and the computing devices within it. Firewalls are generally used to prevent unauthorised traffic from entering the internal, local, or otherwise bounded network or networks of a company, a particular group of users, an individual user, or another such entity; authentication mechanisms may be used to prevent unauthorised persons from logging on to a company's (or other entity's) computers; and encryption may be used to prevent unauthorised persons from reading files on, or sent to or from those computers. Such products cannot be relied upon to work perfectly, however, and because security 'bugs' may exist in other software or hardware, complete network security also requires monitoring and detection, and appropriate response in the event of a breach.

An effective monitoring, detection and response system for a network may be provided internally (e.g. by a system administrator of a company network, or by a user of an individual network). It may include firewalls, secure servers and routers, dedicated intrusion detection systems, and other security products, all of which may provide audit and other information about their status, about possible security/related issues, and about other characteristics or events. These may be assessed by internal system administrators or in an automated or semi-automated manner. Whatever "internal" security provisions an entity uses, these may be augmented by making use of externally-provided network security services. While externally-provided network security services should not generally be used by a customer (e.g. a company, an individual, etc.) as a complete substitute for provisions used by themselves or their own system administrators, individuals and system administrators normally do not have the time or ability to read through large amounts of constantly updated audit information, looking for attacks on their systems. They also may not have the time to continuously monitor the activities of 'hackers' (or other such parties), looking out for new tactics, tools and trends in what they may be using. Also, they may not have the time to become experts on every kind of intrusion or attack and to maintain that expertise.

A monitoring, detection and response system that employs human intelligence, uses trained personnel, and takes advantage of network security intelligence and other knowledge databases can provide network users and system administrators with the advice and coaching they may need, when they need it, to help them repel or otherwise respond to attacks and maintain network integrity and 'uptime'. While completely automatic defenses may be used, and may work against some attacks (particularly automated attacks), they may be at a disadvantage against an intelligent attack, against which a specialist intelligent monitoring, detection and response capability may be needed. Such a specialist capability may be provided by a dedicated external service provision entity (although it will be noted that a corresponding service could also be provided by a similarly dedicated service provision entity within what could still be regarded as a customer's network). In any case, for such a dedicated service to be provided in respect of a network, the network (generally by way of one or more computing devices within it) generally needs to provide information about possible network security incidents or 'events' (such as possible intrusion of unauthorised traffic, possible attempts by unauthorised executable software that has successfully entered the network to take action against the interests of the network or its users, possible attempts by unauthorised to breach or otherwise overcome authentication mechanisms, etc.).

In order to allow such a capability to be provided (whether externally or internally), computing devices in the network and/or software applications running thereon may be arranged to send "status messages" to an entity providing such a capability. These may filtered or otherwise controlled such that only those that may relate to potential network security issues are sent, in which case these may be regarded as "network security messages". Such messages can also be provided by dedicated sensors or probes set up to monitor devices, exchanges of data, and other such interactions between devices in the network. Such messages may be provide information about the devices affected (e.g. their identity, their location in the network, software applications that they have been using, etc.) and/or software applications affected in a form that enables them to be processed manually (i.e. by a human analyst), automatically (i.e. by a computer processor), or by a combination of the two. Such messages generally provide information in the form of data fields of several defined types, in order to allow for efficient processing. This may be necessary because the computing devices in a large network, such as individual computers, firewalls, servers, routers, specific intrusion detection systems, etc. can generate millions of lines of security-related or other status or audit information each day. This may contain information indicative of ongoing network attacks or intrusions, but this may not get noticed in amongst a large amount of other less-critical or non-security-related audit information.

In view of this, it is known that Managed Security Monitoring (MSM) services may be provided and used, which can assist a customer by receiving "network security messages" and/or more general status messages from the customer's network (and from the devices of that network), and filter and analyse the information therein effectively in order to detect such attacks or intrusions, and if required, suggest or provide an appropriate response.

Once a possible attack or intrusion (i.e. a network security "incident" or "event") is detected, its characteristics and particulars may then be examined and analysed by trained security analysts continuously monitoring the customer's network to further understand the incident and eliminate false positives. In analysing the incident, security analysts can draw upon information and knowledge from a variety of sources, including but not limited to security intelligence databases containing information about the characteristics of various hacker techniques and tools and known vulnerabilities in various operating systems and commercial software products and hardware devices. If necessary, security analysts can escalate the handling of the incident according to a variety of possible escalation procedures to stop the attack and shut down the vulnerability before the attacker does any damage. In effect, an MSM service can act as an additional defensive shield for a customer's network.

U.S. Pat. No. 7,895,641 and corresponding International application WO 01/71499 ("Schneier"/"Counterpane") relate to a known technique for dynamic network intrusion monitoring, detection and response. According to this, a probe attached to a customer's network collects status data and other audit information from monitored components of the network, looking for footprints or evidence of unauthorised intrusions or attacks. The probe filters and analyses the collected data to identify potentially security-related events occurring in the network. Identified events are reported to a human analyst for problem resolution. The analyst has access to a variety of databases to aid in problem resolution, and may follow an escalation procedure in the event he or she is unable to resolve the problem. Various customer personnel can be alerted in a variety of ways depending on the nature of the problem and the status of its resolution. Feedback from problem resolution efforts can be used to update the knowledge base available to analysts for future attacks, and may be used to update the filtering and analysis capabilities of the probe and other systems.

Aspects of an existing product, which will be referred to as the "Counterpane product", for providing managed security monitoring (MSM) services essentially in accordance with the technique described in U.S. Pat. No. 7,895,641 will briefly be described, and will be referred to again later in more detail. The Counterpane product uses sensors to monitor customers' data networks for security threats. Data from the sensors in the form of messages are received by a module referred to in the Counterpane product as the "Sentry". This contains a filtering subsystem which classifies the messages as "positive messages" (messages that need to be monitored, as they appear to relate to security issues that may require action to be taken), "negative messages" (messages that may be discarded, because they do not relate to security issues), and "residue messages" (messages that are not possible to parse).

Messages classed as "negative" are discarded.

Messages classed as "positive" are passed to a module referred to as "SOCRATES", an acronym which stands for "Secure Operations Center Responsive Analyst Technical Expertise System". This collects and formats messages into "problem tickets" (each of which represents a discrete security-related event or incident of possible intrusive activity on a customer's network), associates with each such ticket information useful for problem investigation, resolution and response, presents such tickets to security analysts for handling, and generally serves as a repository of useful information and procedures.

The filtering subsystem may be unable to parse the residue messages because it does not have enough filters, or does not have enough information to parse the messages. This may also occur if there has been a change or an error in the format of the security messages. With the Counterpane product (and as described in U.S. Pat. No. 7,895,641), these residue messages are passed to a human analyst for checking and analysis. As this is done manually (i.e. by human analysts) and takes time and human efforts, there may be a significant delay before the residue messages have been analysed. Further, human error may affect the analysis, and/or some residue messages may even be left un-analysed because of lack of manpower.

Residue messages that have been manually analysed may thus get manually classified (correctly or incorrectly) as "positive messages" or "negative messages". Further to this, messages that have been classified (manually or automatically) as "positive messages" or "negative messages" may get manually analysed in a separate operation, and it is possible that this may result in a human decision to the update the filter engine.

Techniques such as the above thus depend on significant manual input from human analysts both in analysing residue messages and in reviewing messages classed as positive.

A known technique in data analysis is "clustering". Clustering algorithms generally aim to divide a set of objects into groups (clusters), where objects in each cluster are similar to each other (and as dissimilar as possible to objects from other clusters). Objects that do not fit well to any of the clusters detected by the algorithm may be considered as "outliers", or to form a special cluster of outliers.

A paper by Risto Vaarandi entitled: "A Data Clustering Algorithm for Mining Patterns From Event Logs" (Proceedings of the 2003 IEEE Workshop on IP Operations and Management, ISBN: 0-7803-8199-8) relates to a problem whereby event logs such as those used in system and network management contain vast amounts of data that can easily overwhelm a human. Identifying that mining patterns from event logs is an important system management task, the paper presents a clustering algorithm for log file data sets which can help in the detection of frequent patterns from log files, in the building of log file profiles, and in the identification of anomalous log file lines. The technique outlined considers standard "sys log" formats that contain free-form text, and suggests using clustering on the full set of event logs in order to try to form clusters that would cover "outliers". It will be understood that clustering is thus used in what can be regarded as a single processing stage on full sets of event logs with the aim of avoiding any of these from being left outside of the clusters.

A paper by Feng Xuewei, Wang Dongxia, Zeng Jiemei, Ma Guoqing, and Li Jin, entitled: "Analyzing and Correlating Security Events Using State Machine" (2010 10th IEEE International Conference on Computer and Information Technology (CIT 2010)) relates to attack scenario reconstruction, clustering analysis, causal analysis, use of an attack scenario tree, and use of a correlating state machine. Recognising that it may be unfeasible for a security manager to analyse security events manually, the paper propose use of an attack scenario reconstruction technology based on a state machine. The processes of attackers can be replicated and more comprehensive attack scenario description information can be generated. The paper appears to suggest using clustering in conjunction with existing knowledge in order to alert an analyst about possible attacks, based on types of attack that have happened previously.

Referring to other (cited) prior art, a paper entitled "Mining Alarm Clusters to Improve Alarm Handling Efficiency" by K. Julisch et al (http://www.acsac.org/2001/papers/115.pdf) discusses a problem wherein intrusion detection systems overload their human operators by triggering thousands of alarms per day, and presents the results of some research indicating that alarms should be managed by identifying and resolving their root causes. It discusses alarm clustering as a method that supports the discovery of root causes.

A paper entitled "An efficient algorithm for clustering intrusion alert" by J. D. Adelina et al (http://www.iatitorq/ volumes/Vol37No2/11Vol37No2.pdf) discusses intrusion detection systems, noting the problems of relying on alert supervision. It proposes using "Meta alerts", which are generated for appropriate clusters and which form generalisations of alerts, as a way of identifying origins of alerts. A hybrid clustering algorithm is proposed which is applied to the data set. Redundant data are filtered in order to reduce the rate of false positives.

US patent application US2004/015719 ("Lee et al") relates to network security protection, and to integrated security systems in which individual security agents are actively inter-related. In particular, it proposes a security system comprising a firewall for interconnecting and controlling access between external and internal networks, a plurality of security agents for monitoring a data flow and system calls over the internal network, an "intelligent" security engine (ISE) for analysing alert messages, traffic information and event information from the security agents to decide if there is an attack and to generate a signature through a learning process, and a security policy manager for managing and applying a security policy to each of the security agents based on a decision of the ISE.

US patent application US2005060562 ("Bhattacharya et al") relates to techniques for displaying network security incidents.

U.S. Pat. No. 8,176,527 ("Njemanze et al") relates to a "correlation engine" or "rules engine" with support for time-based rules. The rules engine receives security events generated by network devices, which are aggregated and provided to the rules engine at specific times associated with time-based rules. The security events are cross-correlated with the time-based rules; and one or more first stage meta-events are reported.

The present inventors have identified a need to provide further assistance in relation to the analysis of messages such as security messages that are sent for processing by a managed security monitoring system, in particular in relation to those that do not match with an existing knowledge base. In relation to parts of the processing that are currently performed manually, the fact that such parts are time consuming when performed by human analysts may mean that they are done incorrectly, done too slowly to be of use in real-time or near real-time processing, or not done at all. While automation is often seen as a solution in relation to tasks that are time-consuming when performed by human analysts, it is not generally possibly to automate parts of a process that rely on decision-making that is not based on existing rules.

SUMMARY OF THE INVENTION

According to a first aspect of the present invention, there is provided a method of processing status messages for use in network security management in respect of a network of computing devices, the status messages each comprising information relating to the network, information relating to at least one of said computing devices therein, or information relating to an event that has been detected by or in respect of the network or detected by or in respect of at least one of said computing devices therein, the information of which a status message is comprised comprising data relating to a plurality of attributes of said network, said at least one computing device, or said event; the method comprising:

filtering received status messages according to filtering rules in order to identify, in dependence on one or more attributes of said status messages:

(i) status messages indicative of potential or actual network security events in respect of which a predetermined response is deemed applicable;
(ii) status messages in respect of which a null response is deemed applicable; and
(iii) residue messages in respect of which the filtering rules neither indicate that a predetermined response is deemed applicable, nor indicate that a null response is deemed applicable;

processing received status messages identified as status messages indicative of potential or actual network security events in respect of which a predetermined response is deemed applicable, such that a predetermined response may be initiated;

in respect of one or more received status messages identified as residue messages, subjecting the one or more residue messages to analysis involving clustering in dependence on one or more attributes thereof; and updating the filtering rules for use in subsequent filtering of received status messages in dependence on the analysis.

According to preferred embodiments, the filtering of a received status message is performed in dependence on a comparison of one or more attributes of said message with corresponding attributes of one or more of said filtering rules.

According to preferred embodiments, the clustering of residue messages comprises subjecting the one or more received status messages identified as residue messages to analysis involving clustering in dependence on one or more attributes of one or more existing filtering rules as well as on one or more attributes of the one or more received status messages identified as residue messages. It will be understood however that the clustering of residue messages need not be dependent on attributes of existing filtering rules, and may be dependent just on attributes of the residue messages. Such analysis may identify clusters of residue messages indicative of a need for the addition of one or more new filtering rules, rather than merely identifying clusters of residue messages indicative of a need for an existing filtering rule to be updated, for example.

According to preferred embodiments, the clustering of residue messages is performed in dependence on a plurality of attributes of each message.

According to preferred embodiments, the clustering of residue messages is performed in dependence on one or more disparity measures each calculated according to a predetermined disparity function dependent on one or more attributes of a residue message and one or more corresponding attributes of one or more of said filtering rules.

According to preferred embodiments, the clustering of residue messages is performed in dependence on one or more disparity measures each calculated according to a predetermined disparity function dependent on one or more attributes of a residue message and one or more corresponding attributes of one or more of other residue messages.

According to preferred embodiments, the updating of the filtering rules may comprise updating one or more of the existing filtering rules. Alternatively or additionally, the updating of the filtering rules may comprise adding one or more new filtering rules.

According to preferred embodiments, the filtering step comprises automatically filtering said received status messages.

According to preferred embodiments, the step of subjecting residue messages to analysis involving clustering comprises subjecting the residue messages to an automated analysis procedure involving clustering. This step may further comprise subjecting at least some of the residue messages to an automated analysis procedure involving subspace clustering.

According to preferred embodiments, the method may further comprise performing a pre-filtering step prior to the filtering step, the pre-filtering step involving preventing status messages according to one or more predetermined categories from being included in the filtering step. Such a pre-filtering step may be used to prevent internal or confidential messages from being forwarded to a remote site or to an external organisation, for example.

According to preferred embodiments, the method may further comprise performing a pre-filtering step prior to the filtering step, the pre-filtering step involving identifying received status messages either as being potentially related to network security or as not being potentially related to network security, and performing the filtering step in respect of status messages identified as being potentially related to network security. Such a pre-filtering step may be used to prevent messages known to be unrelated to network security from affecting the post-filtering analysis.

According to preferred embodiments, the step of processing received status messages identified as being indicative of potential or actual network security events in respect of which a predetermined response is deemed applicable may comprise aggregating a plurality of messages so-identified that have one or more corresponding or similar attributes, whereby to allow a predetermined response to be taken in relation to the aggregated messages. Such aggregation may be used to facilitate subsequent analysis by a human analyst of messages indicative of potential or actual network security events, for example.

According to a second aspect of the present invention, there is provided apparatus for processing status messages for use in network security management in respect of a network of computing devices, the status messages each comprising information relating to the network, information relating to at least one of said computing devices therein, or information relating to an event that has been detected by or in respect of the network or detected by or in respect of at least one of said computing devices therein, the information of which a status message is comprised comprising data relating to a plurality of attributes of said network, said at least one computing device, or said event; the apparatus comprising:
  a filtering module operable to filter received status messages according to filtering rules in order to identify, in dependence on one or more attributes of said status messages:
    (i) status messages indicative of potential or actual network security events in respect of which a predetermined response is deemed applicable;
    (ii) status messages in respect of which a null response is deemed applicable; and
    (iii) residue messages in respect of which the filtering rules neither indicate that a predetermined response is deemed applicable, nor indicate that a null response is deemed applicable;
  a processing module operable to process received status messages identified as status messages indicative of potential or actual network security events in respect of which a predetermined response is deemed applicable, such that a predetermined response may be initiated;
  an analysis module operable to subject one or more received status messages identified as residue messages to analysis involving clustering in dependence on one or more attributes thereof; and
  a filter-rule updating module operable to update the filtering rules for use in subsequent filtering by said filtering module of received status messages in dependence on the analysis.

The various options and preferred embodiments referred to above in relation to the first aspect are also applicable in relation to the second aspect.

BRIEF DESCRIPTION OF THE DRAWINGS

A preferred embodiment of the present invention will now be described with reference to the appended drawings, in which.

DESCRIPTION OF PREFERRED EMBODIMENTS OF THE INVENTION

With reference to the accompanying figures, methods and apparatus according to preferred embodiments will now be described.

Figure 1:
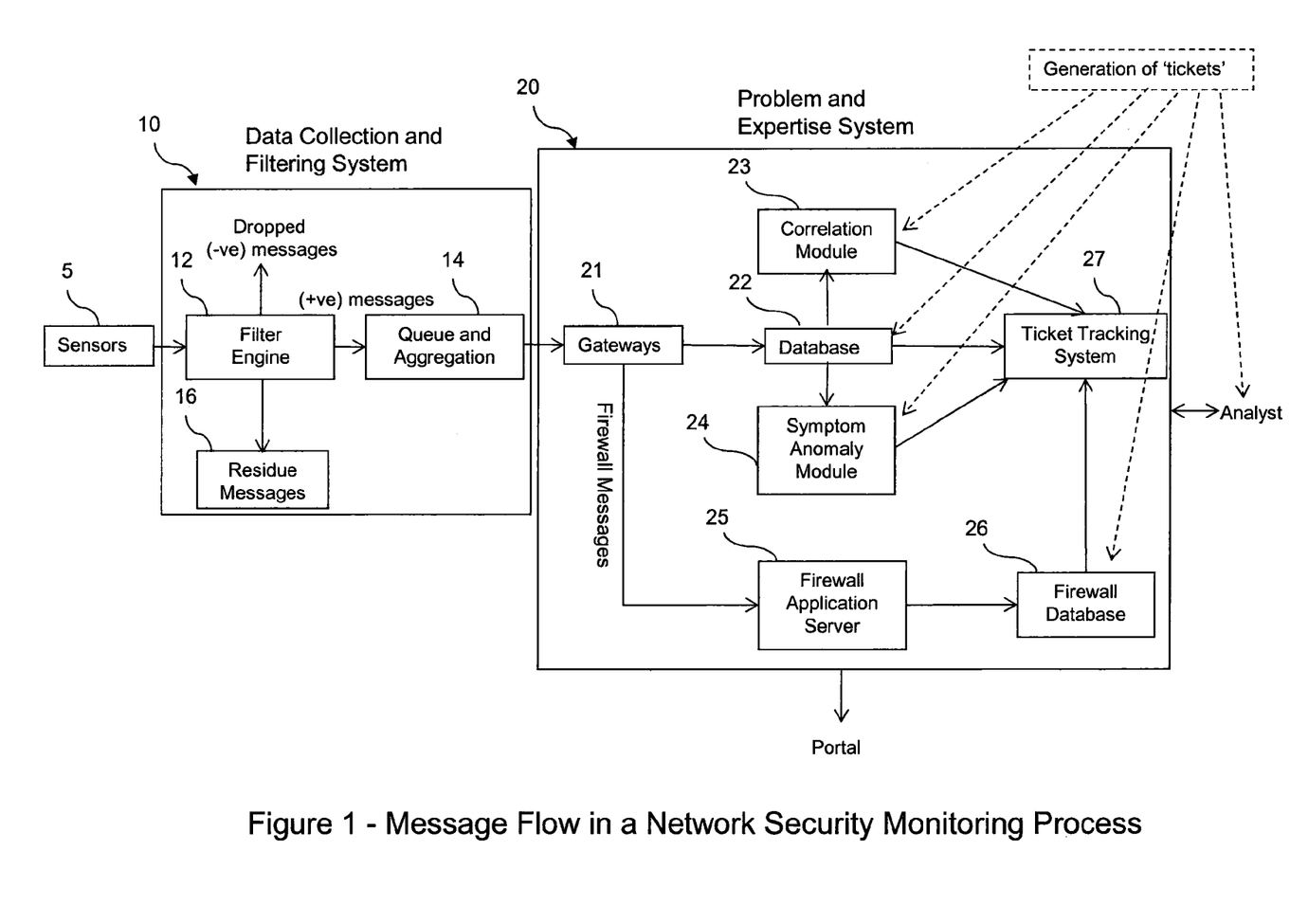
FIG. 1 shows the possible message flow in a network security monitoring process.

FIG. 1 shows the flow of messages within a network security monitoring process. As will become apparent, parts of this correspond partly to parts of a network security monitoring process such as may be performed by the Counterpane product referred to earlier.

Overall, messages from sensors 5 are received by a data collection and filtering system 10. The sensors may monitor and provide messages relating to the customer network in general, the devices therein, customer network traffic (internal communication and communication with external devices), sending status messages about these or other aspects of the network to the data collection and filtering system 10. This may thus receive messages relating to the customer network and to computing devices therein, which may comprise information relating to their status, and/or to events that have been detected by or in respect of the network or detected by or in respect of the computing devices therein.

Figure 2:
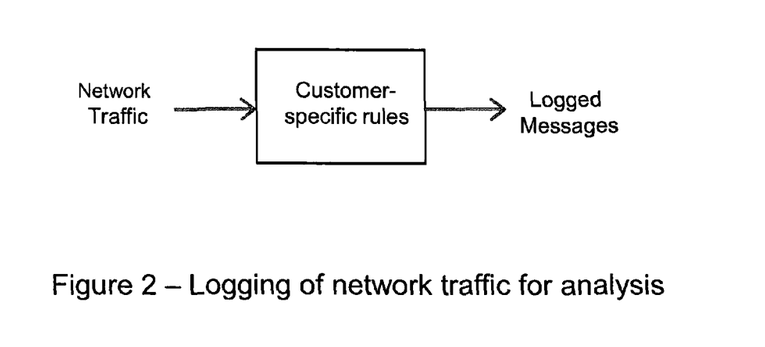
FIG. 2 illustrates the logging of network traffic for analysis.

Sensors generally sit within customer networks and log network traffic. As indicated by FIG. 2, the traffic may be logged depending upon specific customer requirements. This be in dependence on the devices therein and/or applications used therein, or could be dependent on specific threats mentioned by a customer, for example. Data obtained by the sensors 5 may be pre-processed before being passed to the data collection and filtering system 10. This may be done in order to remove messages that clearly relate to internal matters specific to the customer, for example, or to remove messages that clearly relate to other, clearly non-security-related matters, for example, that the customer may not wish to pass to an external service provider. This may be done simply in order to reduce the amount of messages that are passed to the external service provider, or to allow the external service provider to use their expertise specifically in relation to messages that the customer may class as "network security messages", on the grounds that they might include messages indicative of security problems but need expert analysis. Alternatively, the customer may wish to provide all data obtained by the sensors to the data collection and filtering system 10, in order to allow it to perform its filtering function on all such data.

The data collection and filtering system 10 may also sit (topologically) within the customer network and/or be (geographically) located on the customer's premises, or it may be located remotely from the customer's network and/or premises, on the network of and/or at the premises of the external service provider, for example.

The data collection and filtering system 10 contains a filter engine 12, which uses filter rules to classify the messages received as "positive messages", "negative messages", and "residue messages". The filter rules may (initially) be generic or may be customer-specific.

Messages classed as "negative" may be discarded, because they do not relate to security issues, although they may be stored for use in further analysis and updating of the filter rules. Messages classed as "positive" are passed to a queue and aggregation module 14, which aggregates them before forwarding them to a problem and expertise system 20, the function of which will be discussed further later. These may also be used in further analysis and updating of the filter rules, however. Messages classed neither as positive nor as negative are passed to a "residue messages module" 16.

Figure 3:
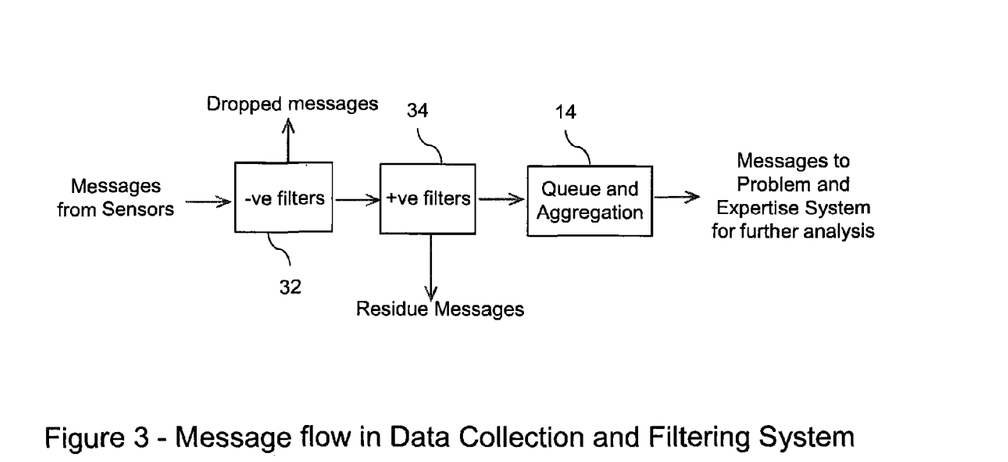
FIG. 3 illustrates the message flow in a data collection and filtering system.

As indicated by FIG. 3, there are generally two types of filters, generally distinguished from each other more by the use made thereof than by the general manner in which they function. For convenience, these two types will be referred to as "negative filters" 32 and "positive filters" 34, although it will be noted that this terminology is optional, and should not be taken to imply that one type simply blocks or allows messages with values above a particular threshold while the other blocks or allows messages with values below a particular threshold. Instead these terms are used in accordance with the idea that messages may be identified as "positive" or "negative" messages as a result of being passed to the filter engine 12 (or as explained earlier, may be identified as neither, in which case they may instead be identified as "residue messages").

Filters of either type (i.e. "positive" or "negative") implement filtering rules, which generally involve a comparison of one or more attributes of a status message with one or more corresponding attributes as defined by a filtering rule. Filtering rules may have attributes defined in terms of thresholds (upper or lower), ranges (inclusive or exclusive), equalities or equalities, or in any or a variety of other ways, allowing corresponding attributes of messages to be compared therewith to determine, on the basis or one or a combination of attributes, whether a message concerned meets the filtering rule of a particular (positive or negative) filter or not.

Negative filters 32 are essentially used to identify and remove messages in respect of which a null response is deemed applicable. These may be messages deemed as irrelevant in that they do not need any further scrutiny, and in respect of which it is known that there is no need for action to be taken in relation to network security.

Positive filters 34 are essentially used to identify and select messages indicative of potential or actual network security events in respect of which a predetermined response is deemed applicable. These may be messages in respect of which it is known or decided that a particular countermeasure is appropriate. Alternatively, the predetermined response may be that further analysis is to be performed, either by a human analyst or by a machine.

Messages in respect of which the filtering rules of the filter engine neither indicate that a predetermined response is deemed applicable, nor indicate that a null response is deemed applicable, are not "caught" by either type of filter, and are referred to as residue messages.

Figure 4:
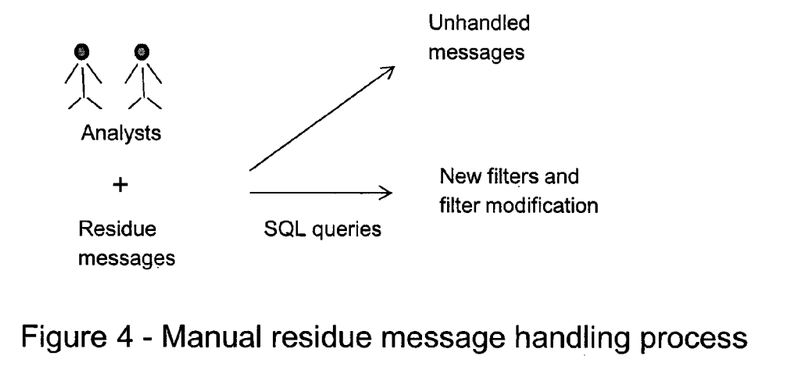
FIG. 4 illustrates a manual residue message handling process.

As explained earlier, if using a system such as the existing Counterpane product, considerable manual effort is often needed (or at least should be performed, but may not always be performed) following the corresponding filtering stage of the process, in order to analyse and "understand" the residue messages, and possibly classify them. As indicated by FIG. 4, analysts may analyse residue messages using SQL queries, depending upon the analyst's understanding of the domain, or other factors. They try to understand the messages, whether they were classified as residue messages due to a change in message format and/or content or due to a new type of message that does not match the existing knowledge-base. As indicated earlier, residue messages are sometimes left un-analysed because of lack of time, allowing important messages to be ignored.

Figure 5:
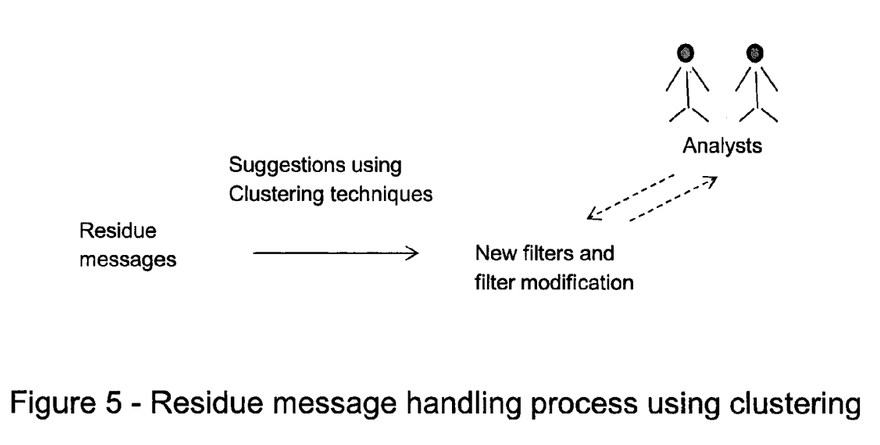
FIG. 5 illustrates a residue message handling process using clustering.

As indicated by FIG. 5, techniques according to preferred embodiments, while not necessarily involving complete automation of the process, may be used in place of human analysts, or to assist analysts in processing the residue messages faster, better, and more efficiently. Such techniques may also help to prioritise the processing of high-severity messages that fall into the residue.

Referring back to FIG. 1, the problem and expertise system 20 categorises, prioritises, investigates and responds to customer incidents or problems. Further detailed explanation of aspects of a possible version of a problem and expertise system 20 (i.e. the "SOCRATES" system), including its components and its functionality, are described in U.S. Pat. No. 7,895,641, the contents of which is incorporated herein by reference, but a brief summary of the overall functionality of such a system will follow in order to illustrate the context in which the presently-described embodiment may be used.

One or more gateway systems 21 may serve a "gatekeeper" function in linking the data collection and filtering system 10 to a Secure Operations Centre (SOC) in which the problem and expertise system 20 is located. Gateways 21 may reformat, add information to, or delete information from incoming messages from the data collection and filtering system 10 to ensure maximum utility of the output, or may allow mutual "pulse monitoring" by the respective systems of their counterparts to ensure that each is continuously operational.

After being received and possibly processed by gateway systems 21, "gateway messages" may be passed for analysis in conjunction with information in a database 22, which may include security intelligence, customer information, problem resolution information, etc. This may pass messages for analysis in a correlation module 23 and/or a symptom anomaly module 24.

The correlation module 23 may be an engine or a series of engines that receive gateway messages as inputs, and provide an output in the form of new gateway messages. It may be used to detect when a combination of events has occurred at various locations or devices and/or times within a customer's network. From this, patterns may emerge that indicate that "correlated" security alerts based on prior non-correlated security alerts should be created.

The symptom anomaly module 24 may receive gateway messages and analyse them in the light of existing event information in order to explain what event(s) may have occurred and caused the messages, and to identify how to verify this and what should be done about it Some gateway messages may be the result of messages from the data collection and filtering system 10 that are marked as relating to firewall issues, or which are otherwise recognisable as "firewall messages". These may be passed for analysis to a firewall application server 25 and a firewall database 26. The firewall application server 25 may receive firewall messages (possibly in compressed or "zipped" form), decompress/unzip them if necessary and forward individual firewall messages to an assigned firewall database. They may be process similarly to other messages, but using a simpler and more parallel workflow than that of non-firewall messages.

In any of the above manners, and possibly others, the problem and expertise system 20 system thus collects and formats gateway messages into "problem tickets", each of which represents a discrete security-related event or incident of possible intrusive activity happening on a customer's network. The correlation module 23, symptom anomaly module 24, firewall database 26, and analysts themselves may all generate tickets.

A ticket tracking system 27 keeps track of the tickets, and may also keep track of any follow-ups and updates that result therefrom. The information from the problem and expertise system 20 may be shared with customers through a customer portal. Tickets and/or advice based thereon may be passed to customers, who may act on them to maintain the security of their networks. Customers may also communicate directly with the analysts if they need to, if the information available to them via their customer portal is insufficient, for example.

Now that the overall message flow within a network security monitoring process has been outlined, there now follows a more detailed explanation of the processing of residue messages, and an explanation of the concept of "clustering" as applied thereto.

Figure 6:
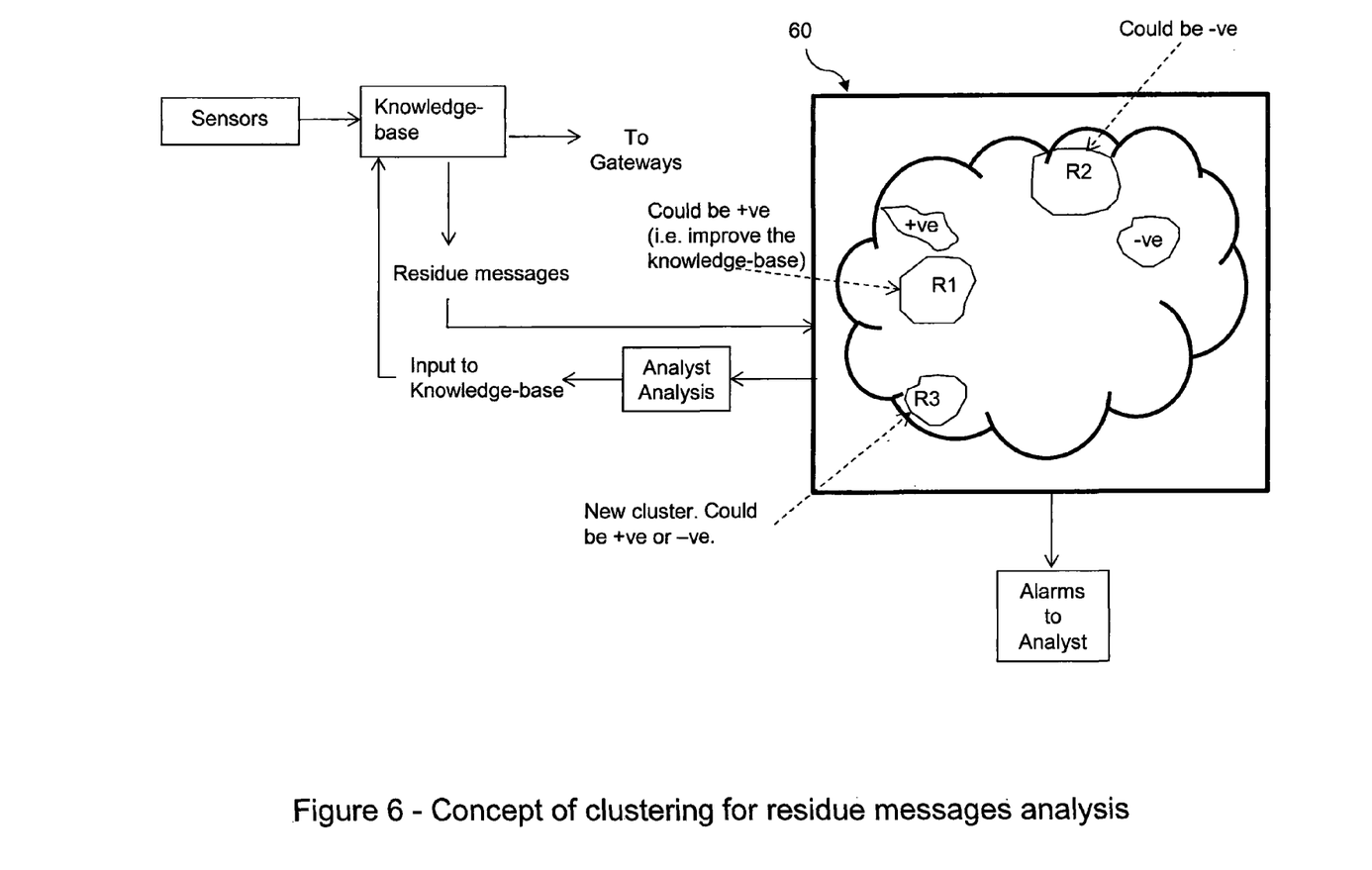
FIG. 6 illustrates the concept of clustering for residue messages analysis.

As shown in FIG. 6, sensors provide messages which then get filtered using an existing knowledgebase represented by the filters of the filter engine into positive, negative and residue messages. The residue is then sent to a 'clustering engine' where analysis of the residue messages (which is explained below) is carried out using a 'clustering' technique. The results of this analysis may be provided to human analysts via a user interface 60 for further analysis, or be used directly and/or automatically in relation to the existing knowledgebase, in order to update the knowledgebase. As will be explained later, this may involve updating (or possibly removing or merging) existing filters from the filter engine, by altering (or possibly cancelling) the rules thereof, or it may involve adding one or more new filters to the filter engine by including new rules therein.

In this manner, the results of analysis of the residue messages using clustering are fed back to the knowledgebase, which may thus be updated, thereby enabling classification of subsequent residue messages to be carried out using the updated knowledgebase. It will be noted that such updating may therefore be done essentially in real-time.

Figure 7:
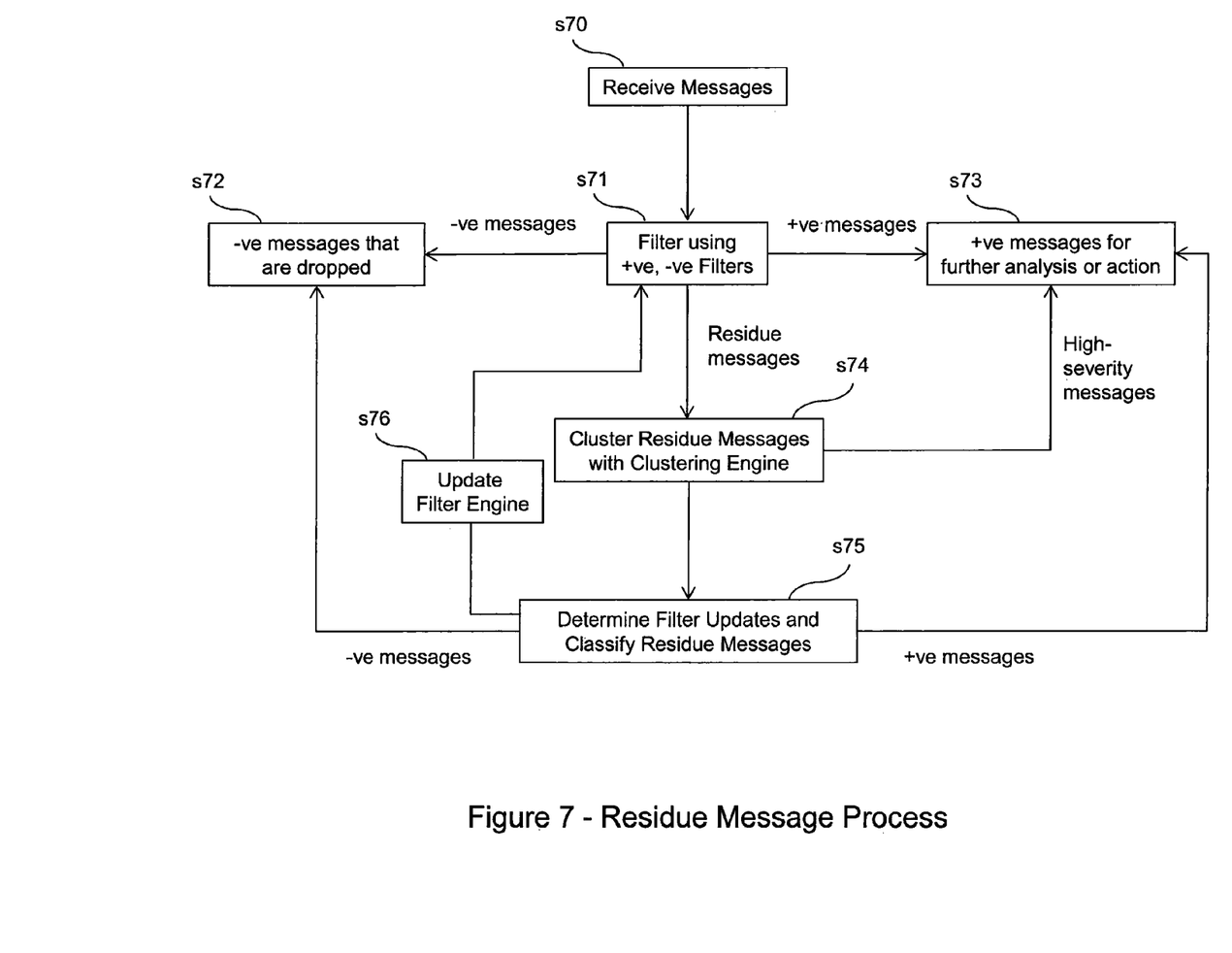
FIG. 7 is a possible residue message process according to a preferred embodiment.

FIG. 7 is a flowchart symbolising the processing of the residue messages. Residue messages are received (step s70) by the data collection and filtering system 10 and passed to the filter engine 12. In a filtering step (s71), the received messages are classified as negative messages or positive messages, or as residue messages. Messages classified as "negative" may be dropped (s72), and messages classified as "positive" may be passed on for further analysis or action (s73). These processes have been discussed elsewhere, and will therefore not be discussed further here.

The residue messages are sent to a 'clustering engine', which may be a separate processing module within the data collection and filtering system 10, or may be provided by other means (remote processing, for example). As will be explained, in the clustering step (s74), processing is performed on messages in dependence on their attributes, and generally in dependence on attributes of existing filters as well, in order to determine whether the residue messages are in fact "near" to existing filters (despite not having been "caught" by them in the earlier filtering process), and also to determine in dependence on their attributes and in dependence on the attributes of other residue messages whether they are similar to other residue messages. It will be understood that at least some of the clustering of residue messages may be dependent just on attributes of the residue messages, and not on those of existing filters. Such analysis may identify clusters of residue messages indicative of a need for the addition of one or more new filtering rules, rather than merely identifying clusters of residue messages indicative of a need for updating of an existing filtering rule, for example.

Such classification of the residue messages (i.e. into clusters and as clusters near existing positive or negative filters or as clusters not near existing filters) happens in step s75, allowing filter updates to be determined. These are then used to update the filter engine as appropriate (s76), such that subsequent residue messages received may be subjected to filtering (s71) by the filter engine 14 according to the updated and/or new filtering rules.

As well as being used to determine updates to the filtering rules, residue messages that appear at this stage to be near to "high-severity" filters may also trigger alarms at this stage, allowing action to be taken even though these messages may not have been caught by positive filters in the earlier filtering process (due to them not quite matching the rules of those filters), or may be passed to an analyst who may take such messages into consideration when performing further analysis.

In determining whether residue messages should form part of a cluster, a disparity measure referred to as a "distance" may be used. This is a measure, in a (generally) multi-dimensional "cluster-space", of the overall disparity between a particular message and a particular cluster, with reference to the respective attributes by which each is categorised.

The distance "d" of a residue message "m" from respective clusters "$C_i$" may be calculated using a function in the following form, for example:

$$d_{m,i} = \sqrt{(A_1 - A_{C_i,1})^2 + (A_2 - A_{C_i,2})^2 + \ldots + (A_n - A_{C_i,n})^2}$$

where $A_x$ is the value of the $x^{th}$ attribute of message "m", $A_{C_i,y}$ is the value of the $y^{th}$ attribute of cluster "$C_i$", and "n"

is the number of attributes being taken into consideration. Other functions may of course be used that take account of some or all of the respective attributes by which the messages and the clusters are categorised, and indicate in dependence thereon a measure of disparity between a particular message and the respective clusters.

Referring back to FIG. 6, this attempts to indicate, using the two dimensions available in a drawing, how residue messages, or newly-formed clusters of residue messages (R1, R2, R3) may be regarded as being "near" existing positive filters (R1 is near "+ve"), "near" existing negative filters (R2 is near "−ve"), or not near any existing filters (R3).

If the residue messages appear near normal positive filters and can be classified as positive, they can then join the normal queue of positive messages and be processed accordingly. If the messages appear near normal negative filters and can be classified as negative, they can be dropped. The knowledge gained by this process is fed back to the knowledge system by way of filter engine updates. If the new filters need to be formed (due to a determination that messages such as R3 should in fact be considered as negative, and that subsequent messages similar to them should be caught be a negative filter) then the knowledge-base is upgraded to incorporate a new filter having appropriate filtering rules to catch subsequent residue messages having attributes such as those in R3.

Figure 8:
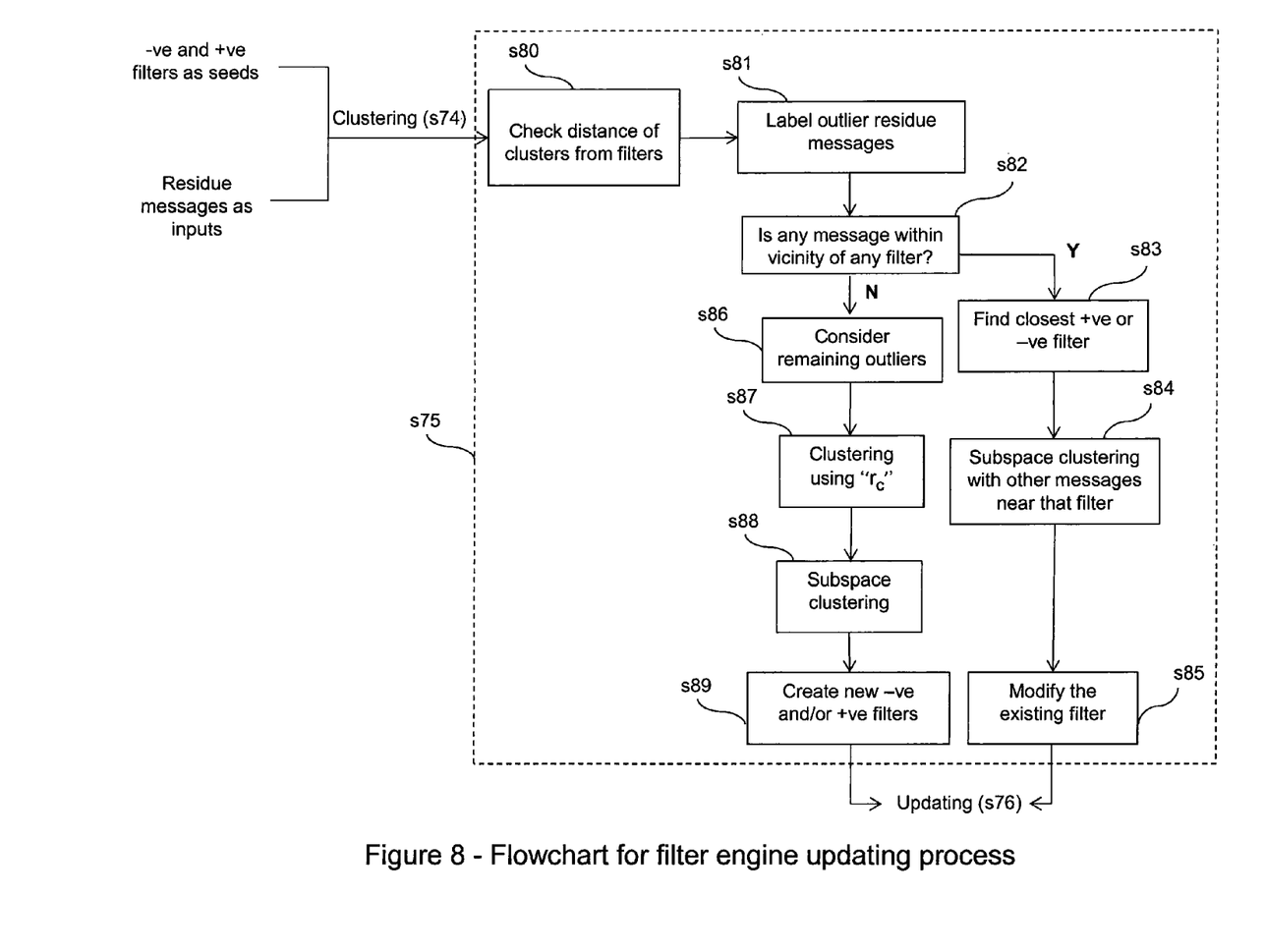
FIG. 8 is a flowchart illustrating a possible process for updating a filter engine following the processing of residue messages, which may be used in a method according to a preferred embodiment.

Referring to the flowchart shown as FIG. 8, this illustrates two ways in which change in the knowledge-base from residue message analysis can be incorporated into the filter engine 12. One involves modifying one, or more of the existing filters, e.g. if the characteristics of the residue messages are found to be similar (using a disparity measure such as that discussed above, or otherwise) to those of one or more existing filters. Another is to add new negative and/or positive filters (again depending upon the characteristics of the residue message).

As explained earlier, the residue is provided to the clustering engine, with existing positive and negative filters being used as seeds in the clustering process (s74 of FIG. 7). The largest radius of the clusters may be denoted by '$r_c$', or each cluster '$C_i$' may have a radius '$r_{ci}$'. Residue messages are clustered as appropriate. Some messages and/or clusters of messages may be found to be near existing filters, indicating that the rules for those filters should be updated in order that similar such messages subsequently received should be caught by those filters. Any message that is sufficiently distant from any of the filters (i.e. outside the appropriate radius for each) may be considered as an outlier, and may be clustered with other such messages or serve as a basis for forming a new cluster.

Looking into this in more detail, at step s80, the distance of each cluster from the existing filters is determined. For those that are sufficiently near an existing filter, an update to the rules of that filter may be determined (s75 of FIG. 7) and implemented in the filter engine (s76 of FIG. 7).

At step s81, messages found to have a distance from any existing filter greater than the relevant threshold (i.e. '$r_c$' '$r_{ci}$', etc.) are labelled as outlier messages.

If it is determined at step s82 that any messages are in the vicinity of any of the existing filters, the closest negative or positive filters are identified (s83). For messages near a particular filter, the cluster characteristics are then studied using subspace clustering (s84) and compared with the filter characteristics. This may indicate that the rules of that filter are failing to catch messages due to the value or identity of a particular attribute, but would otherwise (correctly) have been caught by that filter, for example. An analyst may then use this information to identify an update to the rules of that filter (s85) that would result in those messages being caught (if deemed appropriate), possibly by changing that filter's requirement in relation to the attribute highlighted in the subspace clustering step. An appropriate update may then be implemented (s76 of FIG. 7).

At step s86, the remaining outlier messages (i.e. those that are not in the vicinity of any existing filters are considered. At step s87, clustering is carried out in respect of the remaining outliers. At step s88, subspace clustering is carried out to understand these clusters and their relationships if any. Similarly, this may be in order to identify particular attributes that are resulting in a significant number of these remaining outlier messages not being near let alone caught by any existing filter. At step s89, new filters may be created based on the knowledge obtained in step s88 if appropriate.

Figure 9:
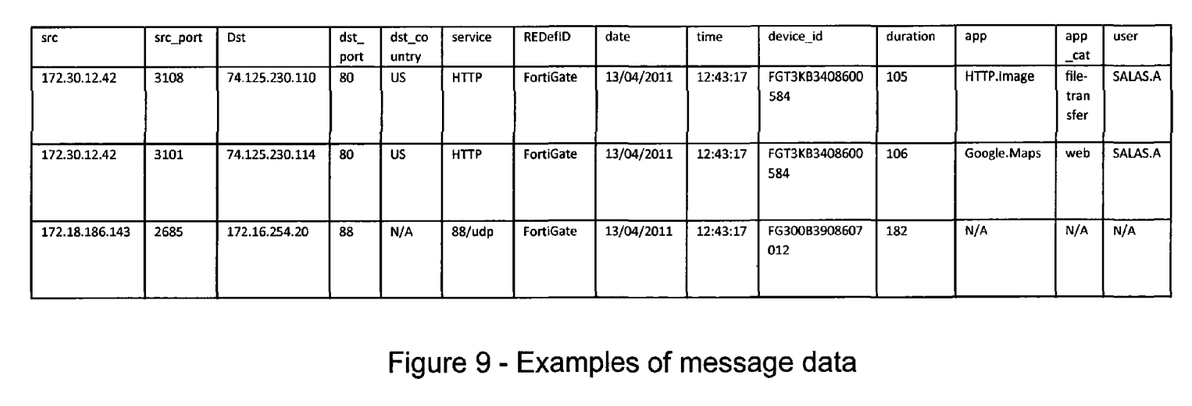
FIG. 9 shows three examples of messages, and illustrates possible data fields of which status messages or network security messages may be comprised.

A sample of message data for the analysis is shown in FIG. 9. In this, the fields shown may represent the following attributes (although it should be noted that these fields and their explanations are given by way of example only):

'src' represents the source IP address

'src_port' represents the source port number

'Dst' represents the destination IP address, i.e. the IP address of the device where the last target destination of the message is.

'dst_port' represents the destination port address

'dst_country' represents the country where the destination device is located.

'service' represents the service currently being used, and/or to which the message relates 'REDefID' refers to the table of contents for the syslog matching expression sets 'date' and 'time' are self-explanatory 'device_id' represents the sensor ID, or may represent the device IP address 'duration' indicates the length of time for which the application was accessed (or may indicate how long a transaction took, for example)

'app' represents the application currently being used, and/or to which the message relates 'app_cat' represents the application category 'user' represents the user of the device, or the user currently registered as using the device By way of example, we will take the simple case of a positive filter that covers the following:

src_ip: All, src_port: 3108, dst_port: 80, app_cat: filetransfer, user: All

On filtering, the first message from FIG. 9 would pass through the positive filter and would therefore be sent for further analysis. The second message does not pass through the filter, so (assuming it is not caught by any other filter, positive or negative), it lands in the residue. On clustering, it may be found to be near to the above filter but not caught by it (due to the value in the 'src_port' field). Continuing further with subspace clustering may indicate that 'src_port' and 'app_cat' are the attributes that are keeping the message apart from the filter cluster in question.

From the above attributes, an analyst can decide to update the existing filter to accommodate subsequent messages the same as or similar to the message in question, or include a new filter, perhaps creating a new negative filter to ensure that such messages are automatically regarded as negative and dropped in the future.

Figure 10:
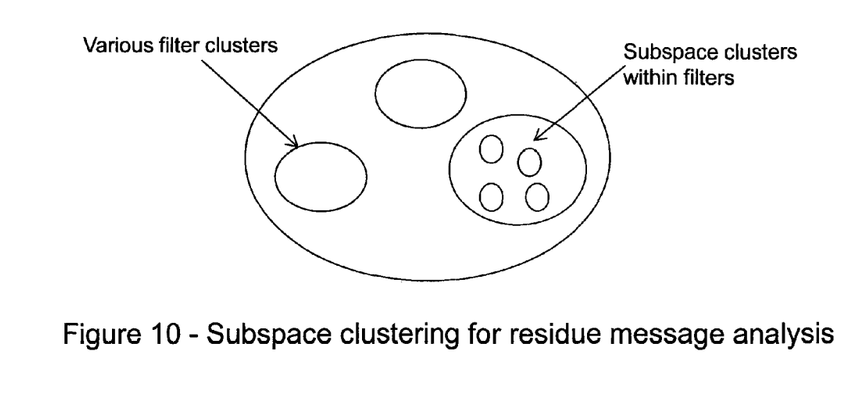
FIG. 10 illustrates the concept of subspace clustering for residue message analysis.

Residue messages form clusters around positive and negative filters as well as independent clusters (depending on the messages). Clusters of residue messages around filters may be distant from actual filters for reasons that may need to be analysed. The details of each cluster may be analysed separately using the technique of subspace clustering, which is illustrated by FIG. 10. Features selected for subspace clustering may provide more information, indicating, for example, the attribute or attributes by virtue of which messages or clusters of messages are distant from one or more filters. For example, as explained in relation to the example messages above, it may be identified that 'src_port' and 'app_cat' are the attributes by virtue of which the messages are being kept apart from a particular filter cluster. Thus, some or all of the residue messages may automatically be compared with characteristic of the clusters and the filters, thereby saving time for analysts, who can then make use of this information to modify and/or to update the existing filters.

Using the correct attributes may help in better understanding the data by producing subspace clusters. This concept can be used to learn more about the data.

As indicated, each of the clusters produced may then be analysed using subspace clustering. This may lead to clusters being found in different subspaces within a dataset. Thus each cluster around a filter may get further divided into groups that may help to understand the reasons why the messages were not filtered, and assist in the process of updating or modifying the filter.

Figure 11:
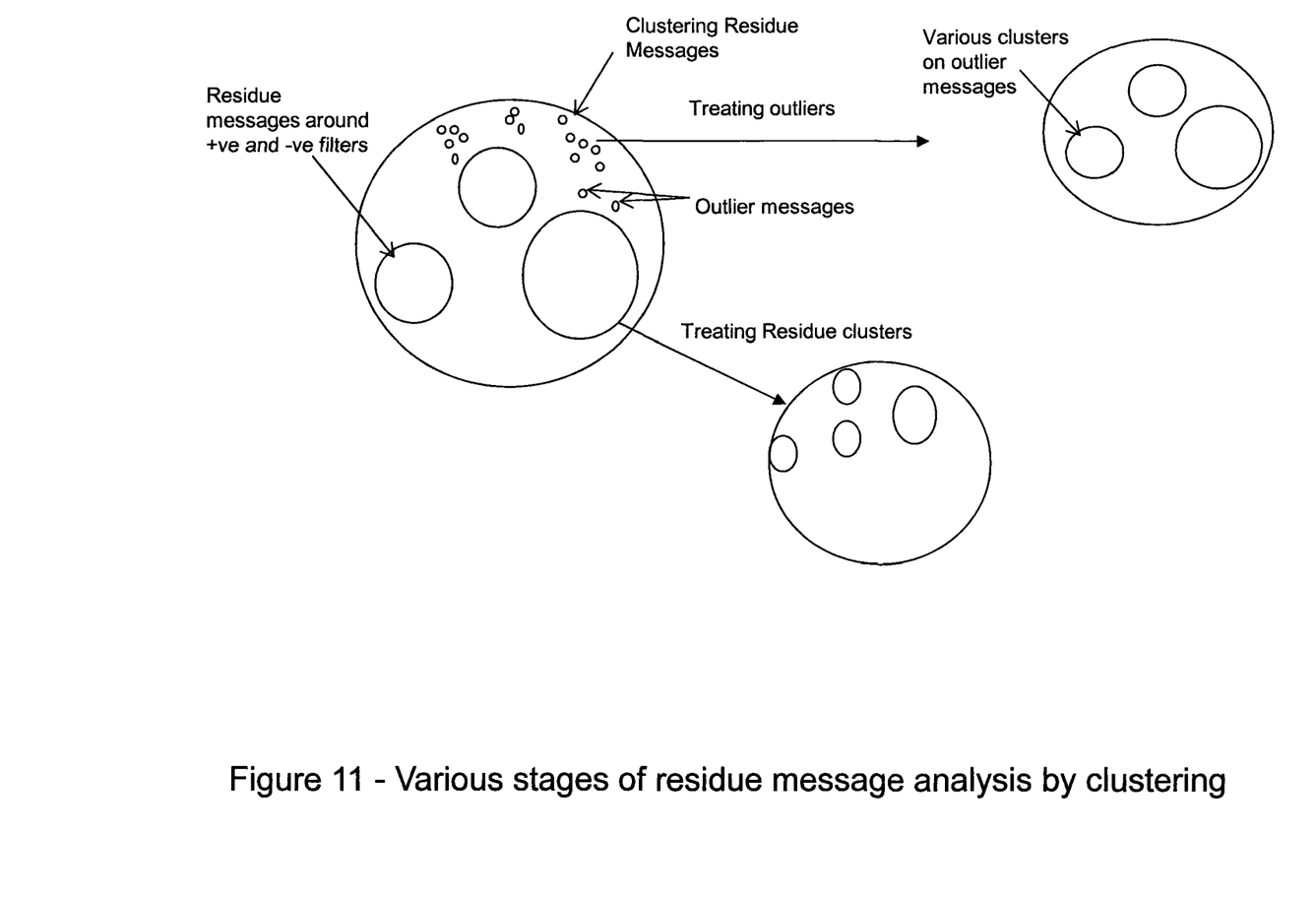
FIG. 11 illustrates various stages of residue message analysis by clustering.

Referring to FIG. 11, in a first stage outlier clustering is used to separate the messages that are not close to any of the positive or negative messages and appear to need completely new filters. This happens because the knowledgebase of filters is not rich enough to deal with these messages or the knowledgebase is still under development.

The aim here may be not to remove the data only because it is "noise" but also to separate the data that could help in the forming of new filters. In the case of outliers, important information may be provided by data that on initial analysis may appear to be part of the background noise, relating to messages that do not confirm to the rules of any existing filters. While the values of attributes in messages may be well beyond the attribute value range of an existing filter, it may not be appropriate to dismiss this as noise in the data. Instead, it may indicate that a particular attribute of an existing filter needs to be changed, or that a new filter should be created. In some cases, it may turn out that this is simply noise, but analysis using clustering (and possibly subspace clustering) may allow this to be determined.

For outliers, i.e. messages or clusters thereof that are not within the vicinity of any positive or negative clusters, clustering may be carried out using '$r_c$' (or '$r_{ci}$', as appropriate) as a minimum distance for the cluster centres. Analysts may use these new clusters to create new negative and/or positive filters.

Looking again at the sample messages shown in FIG. 9, the third message has a few attributes by virtue of which it differs from the filter (defined earlier) and the other two sample messages. This third message may therefore be considered as an "outlier". On carrying out clustering on the outliers, an analyst can see characteristics of the clustered outliers and can form a new filter using the cluster information. An analyst can use subspace clustering on the clusters formed from outliers to understand the information in more detail, and form more crisp filters.

An analyst may have a graphic user interface 60 as shown in FIG. 6, in which clusters and messages may be represented visually so that the analyst may take action to update or to create filters using procedures such as those described above.

The invention claimed is:

1. A method of processing status messages for use in network security management in respect of a network of computing devices, the status messages each comprising information relating to the network, information relating to at least one of said computing devices therein, or information relating to an event that has been detected by or in respect of the network or detected by or in respect of at least one of said computing devices therein, the information of which a status message is comprised comprising data relating to a plurality of attributes of said network, said at least one computing device, or said event; the method comprising one or more processors performing steps of:

filtering received status messages according to filtering rules in order to identify, in dependence on one or more attributes of said status messages:
(i) status messages indicative of network security events in respect of which a predetermined response is deemed applicable;
(ii) status messages in respect of which a null response is deemed applicable; and
(iii) residue messages in respect of which the filtering rules neither indicate that a predetermined response is deemed applicable, nor indicate that the null response is deemed applicable;

processing the received status messages identified as status messages indicative of network security events in respect of which the predetermined response is deemed applicable, such that the predetermined response may be initiated;

in respect of one or more received status messages identified as residue messages, having separated the one or more residue messages from those received status messages identified as being indicative of network security events in respect of which a predetermined response is deemed applicable and from those received status messages in respect of which the null response is deemed applicable, subjecting just the one or more residue messages to analysis involving clustering in dependence on one or more attributes thereof; and updating the filtering rules for use in subsequent filtering of received status messages using an automated updating procedure dependent on one or more results of the analysis;

wherein the clustering of residue messages is performed in dependence on one or more disparity measures each calculated according to a predetermined disparity function dependent on one or more attributes of the residue message and one or more corresponding attributes of one or more of said filtering rules.

2. The method according to claim 1 wherein the filtering of said received status messages is performed in dependence on comparisons of one or more attributes of said messages with corresponding attributes of one or more of said filtering rules.

3. The method according to claim 1 wherein the clustering of residue messages is performed in dependence on a plurality of attributes of each message.

4. The method according to claim 1 wherein updating the filtering rules comprises updating one or more of the existing filtering rules.

5. The method according to claim 1 wherein updating the filtering rules comprises adding one or more new filtering rules.

6. The method according to claim 1 wherein the filtering step comprises automatically filtering said received status messages.

7. The method according to claim 1 wherein the step of subjecting residue messages to analysis involving clustering comprises subjecting the residue messages to an automated analysis procedure involving clustering.

8. The method according to claim 7 wherein the step of subjecting residue messages to analysis involving clustering further comprises subjecting at least some of the residue messages to an automated analysis procedure involving sub-space clustering.

9. The method according to claim 1, further comprising performing a pre-filtering step prior to the filtering step, the pre-filtering step involving preventing status messages according to one or more predetermined categories from being included in the filtering step.

10. The method according to claim 1, further comprising performing a pre-filtering step prior to the filtering step, the pre-filtering step involving the identifying received status messages either as being related to network security or as not being related to network security, and performing the filtering step in respect of status messages identified as being related to network security.

11. The method according to claim 1 wherein the step of processing received status messages identified as status messages indicative of network security events in respect of which a predetermined response is deemed applicable comprises aggregating a plurality of messages so-identified that have one or more corresponding attributes, whereby to allow a predetermined response to be taken in relation to the aggregated messages.

12. The method according to claim 1 wherein the clustering of residue messages comprises subjecting the one or more received status messages identified as residue messages to analysis involving clustering in dependence on one or more attributes of one or more existing filtering rules and on one or more attributes of the one or more received status messages identified as residue messages.

13. An apparatus for processing status messages for use in network security management in respect of a network of computing devices, the status messages each comprising information relating to the network, information relating to at least one of said computing devices therein, or information relating to an event that has been detected by or in respect of the network or detected by or in respect of at least one of said computing devices therein, the information of which a status message is comprised comprising data relating to a plurality of attributes of said network, said at least one computing device, or said event; the apparatus comprising:
a processing system, including one or more computer processors, the processing system being at least configured to:
filter received status messages according to filtering rules in order to identify, in dependence on one or more attributes of said status messages:
(i) status messages indicative of network security events in respect of which a predetermined response is deemed applicable;
(ii) status messages in respect of which a null response is deemed applicable; and
(iii) residue messages in respect of which the filtering rules neither indicate that the predetermined response is deemed applicable, nor indicate that the null response is deemed applicable;
process the received status messages identified as status messages indicative of network security events in respect of which the predetermined response is deemed applicable, such that the predetermined response may be initiated;
in respect of one or more received status messages identified as residue messages, having separated the one or more residue messages from those received status messages identified as being indicative of network security events in respect of which a predetermined response is deemed applicable and from those received status messages in respect of which the null response is deemed applicable, subject just the one or more received status messages identified as residue messages to analysis involving clustering in dependence on one or more attributes thereof; and
update the filtering rules for use in subsequent filtering of received status messages using an automated updating procedure dependent on one or more results of the analysis;
wherein the clustering of residue messages is performed by the processing system in dependence on one or more disparity measures each calculated according to a predetermined disparity function dependent on one or more attributes of the residue message and one or more corresponding attributes of one or more of said filtering rules.

14. The apparatus according to claim 13, wherein the filtering of said received status messages is performed by the processing system in dependence on comparisons of one or more attributes of said messages with corresponding attributes of one or more of said filtering rules.

15. The apparatus according to claim 13, wherein the clustering of residue messages is performed by the processing system in dependence on a plurality of attributes of each message.

16. The apparatus according to claim 13, wherein the subjecting of residue messages to analysis involving clustering by the processing system comprises subjecting the residue messages to an automated analysis procedure involving clustering.

17. The apparatus according to claim 16, wherein the subjecting of residue messages to analysis involving clustering further by the processing system comprises subjecting at least some of the residue messages to an automated analysis procedure involving sub-space clustering.

18. The apparatus according to claim 13, wherein the processing system is further configured to perform a pre-filtering step prior to said filtering, the pre-filtering involves preventing status messages according to one or more predetermined categories from being included in the filtering.

19. The apparatus according to claim 13, wherein the processing system is further configured to perform a pre-filtering step prior to the filtering step, the pre-filtering step involving identifying received status messages either as being related to network security or as not being related to network security, and perform the filtering step in respect of status messages identified as being related to network security.

20. The apparatus according to claim 13, wherein the processing of the received status messages identified as status messages indicative of network security events in respect of which a predetermined response is deemed applicable by the processing system comprises aggregating a plurality of messages so-identified that have one or more corresponding attributes, whereby to allow a predetermined response to be taken in relation to the aggregated messages.

21. The apparatus according to claim 13, wherein the clustering of residue messages by the processing system comprises subjecting the one or more received status messages identified as residue messages to analysis involving clustering in dependence on one or more attributes of one or more existing filtering rules and on one or more attributes of the one or more received status messages identified as residue messages.

22. A method of processing status messages for use in network security management in respect of a network of computing devices, the status messages each comprising information relating to the network, information relating to at least one of said computing devices therein, or information relating to an event that has been detected by or in respect of the network or detected by or in respect of at least one of said computing devices therein, the information of which a status message is comprised comprising data relating to a plurality of attributes of said network, said at least one computing device, or said event; the method comprising one or more processors performing steps of:

filtering received status messages according to filtering rules in order to identify, in dependence on one or more attributes of said status messages:
(i) status messages indicative of network security events in respect of which a predetermined response is deemed applicable;
(ii) status messages in respect of which a null response is deemed applicable; and
(iii) residue messages in respect of which the filtering rules neither indicate that the predetermined response is deemed applicable, nor indicate that the null response is deemed applicable;
processing the received status messages identified as status messages indicative of network security events in respect of which the predetermined response is deemed applicable, such that the predetermined response may be initiated;
in respect of one or more received status messages identified as residue messages, having separated the one or more residue messages from those received status messages identified as being indicative of network security events in respect of which the predetermined response is deemed applicable and from those received status messages in respect of which the null response is deemed applicable, subjecting just the one or more residue messages to analysis involving clustering in dependence on one or more attributes thereof; and
updating the filtering rules for use in subsequent filtering of received status messages using an automated updating procedure dependent on one or more results of the analysis;
wherein the clustering of residue messages is performed in dependence on one or more disparity measures each calculated according to a predetermined disparity function dependent on one or more attributes of the residue message and one or more corresponding attributes of one or more of other residue messages.

23. An apparatus for processing status messages for use in network security management in respect of a network of computing devices, the status messages each comprising information relating to the network, information relating to at least one of said computing devices therein, or information relating to an event that has been detected by or in respect of the network or detected by or in respect of at least one of said computing devices therein, the information of which a status message is comprised comprising data relating to a plurality of attributes of said network, said at least one computing device, or said event; the apparatus comprising:

a processing system, including one or more computer processors, the processing system being at least configured to:
filter received status messages according to filtering rules in order to identify, in dependence on one or more attributes of said status messages:
(i) status messages indicative of network security events in respect of which a predetermined response is deemed applicable;
(ii) status messages in respect of which a null response is deemed applicable; and
(iii) residue messages in respect of which the filtering rules neither indicate that the predetermined response is deemed applicable, nor indicate that the null response is deemed applicable;
process the received status messages identified as status messages indicative of network security events in respect of which the predetermined response is deemed applicable, such that the predetermined response may be initiated;
in respect of one or more received status messages identified as residue messages, having separated the one or more residue messages from those received status messages identified as being indicative of network security events in respect of which the predetermined response is deemed applicable and from those received status messages in respect of which the null response is deemed applicable, subject just the one or more residue messages to analysis involving clustering in dependence on one or more attributes thereof; and
update the filtering rules for use in subsequent filtering of received status messages using an automated updating procedure dependent on one or more results of the analysis;
wherein the clustering of residue messages is performed by the processing system in dependence on one or more disparity measures each calculated according to a predetermined disparity function dependent on one or more attributes of the residue message and one or more corresponding attributes of one or more of other residue messages.

* * * * *